Jan. 19, 1971 A. BAUMEISTER 3,555,796
TELESCOPIC COMBINE REEL
Filed May 15, 1969 4 Sheets-Sheet 1

INVENTOR
ALOIS BAUMEISTER
BY Tweedale & Gerhardt
ATTORNEYS

United States Patent Office 3,555,796
Patented Jan. 19, 1971

3,555,796
TELESCOPIC COMBINE REEL
Alois Baumeister, Kassel, Germany, assignor to Massey-Ferguson G.m.b.H., Kassel, Germany, a corporation of Germany
Filed May 15, 1969, Ser. No. 824,800
Claims priority, application Great Britain, May 30, 1968, 25,858/68
Int. Cl. A01d *57/04*
U.S. Cl. 56—221
9 Claims

ABSTRACT OF THE DISCLOSURE

A combine header has a telescopic reel movable between extended and contracted conditions. The reel is in two portions each of which comprises spaced spiders interconnected by cross bars. The inner spiders overlap to limit movement to the extended condition. The reel portions are annularly offset so that the bars are staggered to facilitate telescoping. One of the reel portions has a central hexagonal shaft received by spaced rollers on the hollow central shaft of the other reel portion to provide both a driving and telescopic connection.

---

This invention relates to a reel for the header of a combine harvester, hereinafter referred to as a "combine."

A combine header consists generally of a table mounted at the front of the combine and having a floor, end walls, and a rear wall with a feed opening, and a cutter and an auger on the table, and a reel, all extending widthwise of the table. For road travel, the width of the header is inconvenient and may be dangerous. In co-pending patent application S.N. 756,732, filed Aug. 21, 1968, and titled "Adjustable Harvester Table," there are described combine headers and parts thereof which can be contracted to a condition suitable for road travel.

According to the present invention a combine header reel comprises two reel portions having cross bars, the bars of one of said reel portions being angularly spaced relative to the bars of the other portion, and being carried respectively by parts of a central telescopic shaft so that one reel portion is adjustable relative to the other portion between an extended condition and a contracted road travel condition, the parts of the shaft being so connected one within the other to provide a driving connection therebetween.

Preferably, the driving connection between the parts of the telescopic shaft comprises circumferentially spaced rollers on one of the parts bearing on correspondingly spaced runways on the other part of the shaft.

Preferably also, the runways are formed of alternate faces of a hexagonal shaft.

The reel may be of the universal type.

A preferred embodiment of the invention will now be described, by way of example, with reference to the accompanying diagrammatic drawings, in which.

Figure 1:
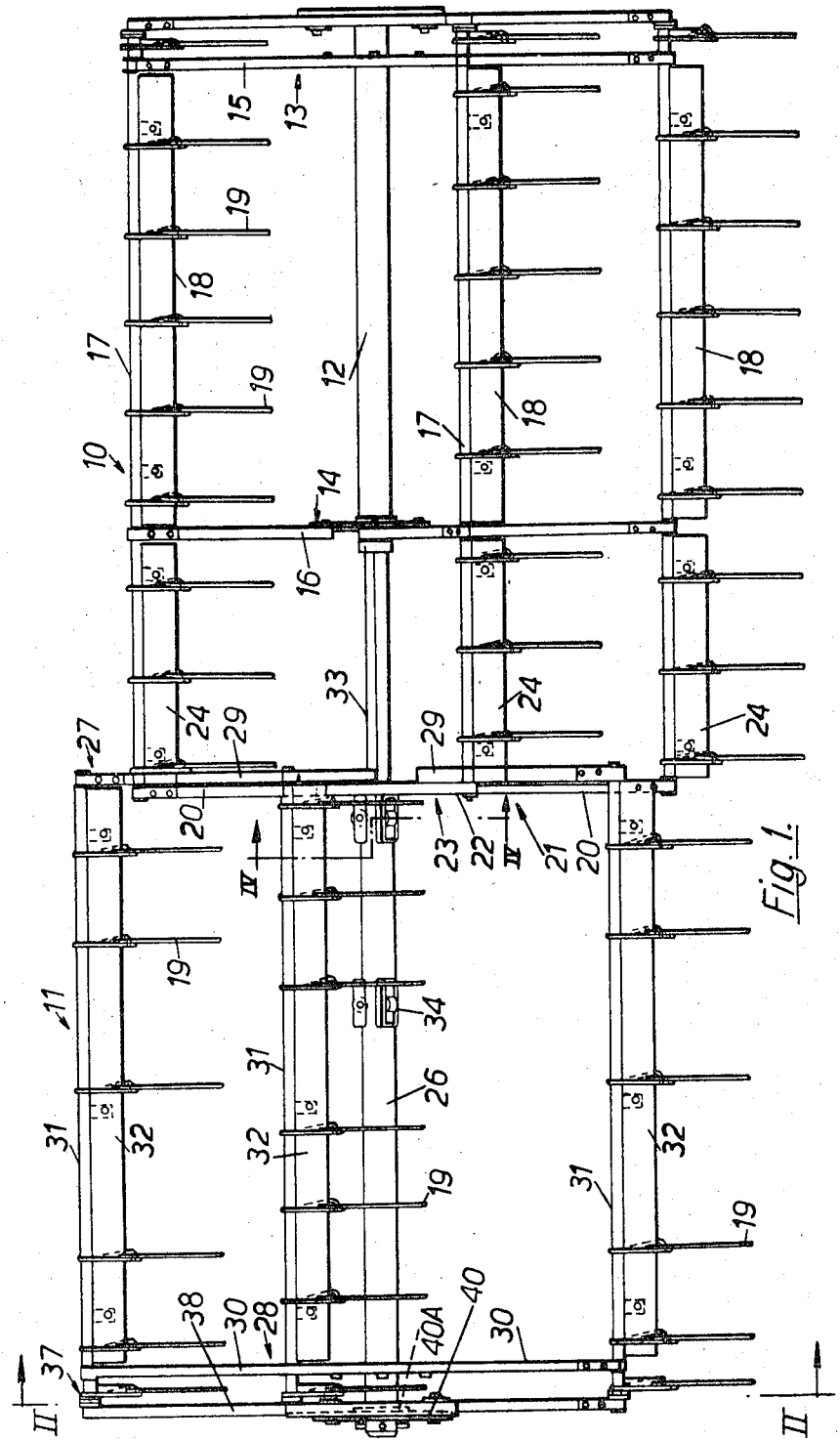
FIG. 1 is a front elevation of a reel according to the present invention in its fully extended condition.
Figure 2:
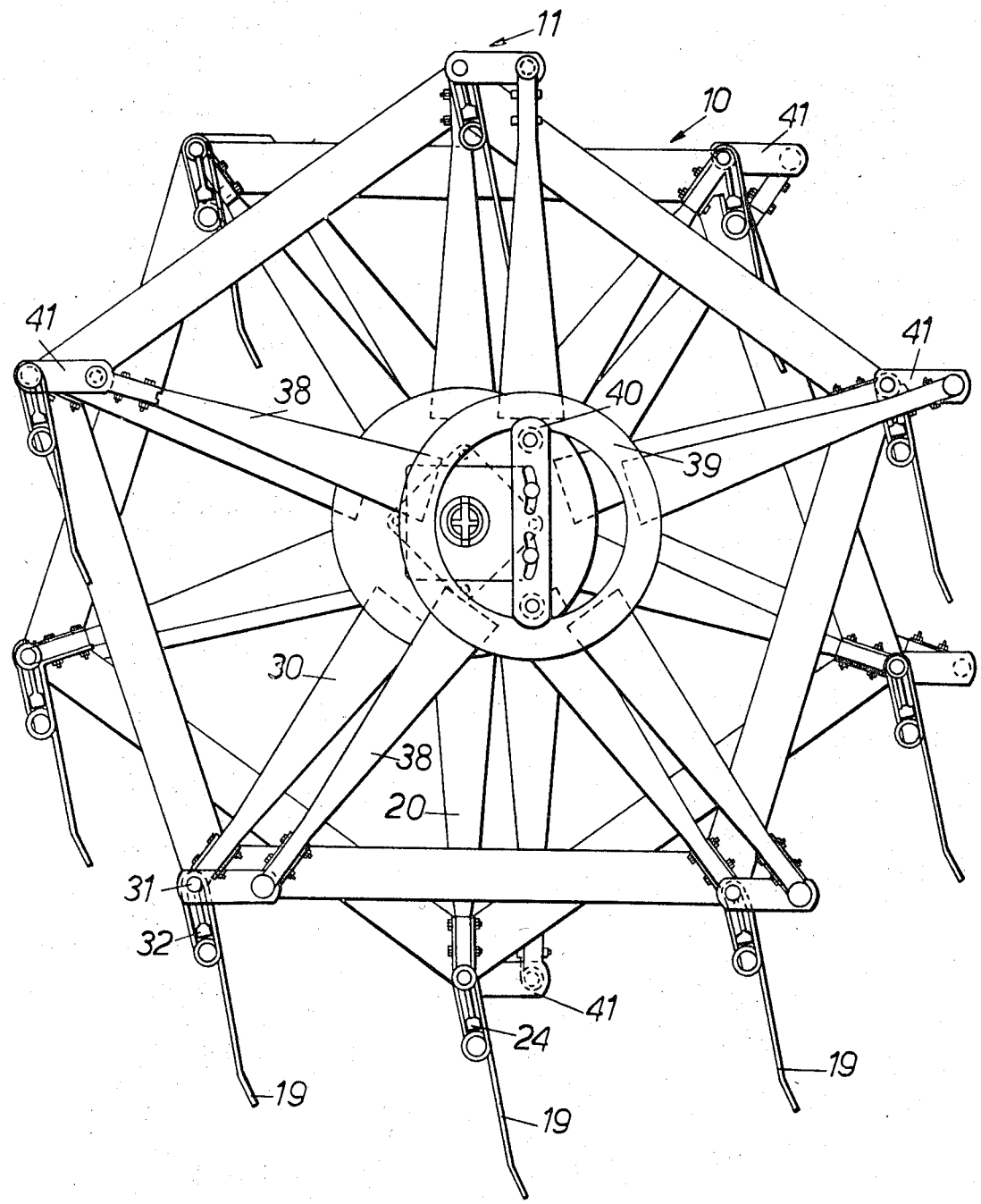
FIG. 2 is an end elevation on the line II—II of FIG. 1 to an enlarged scale.
Figure 3:
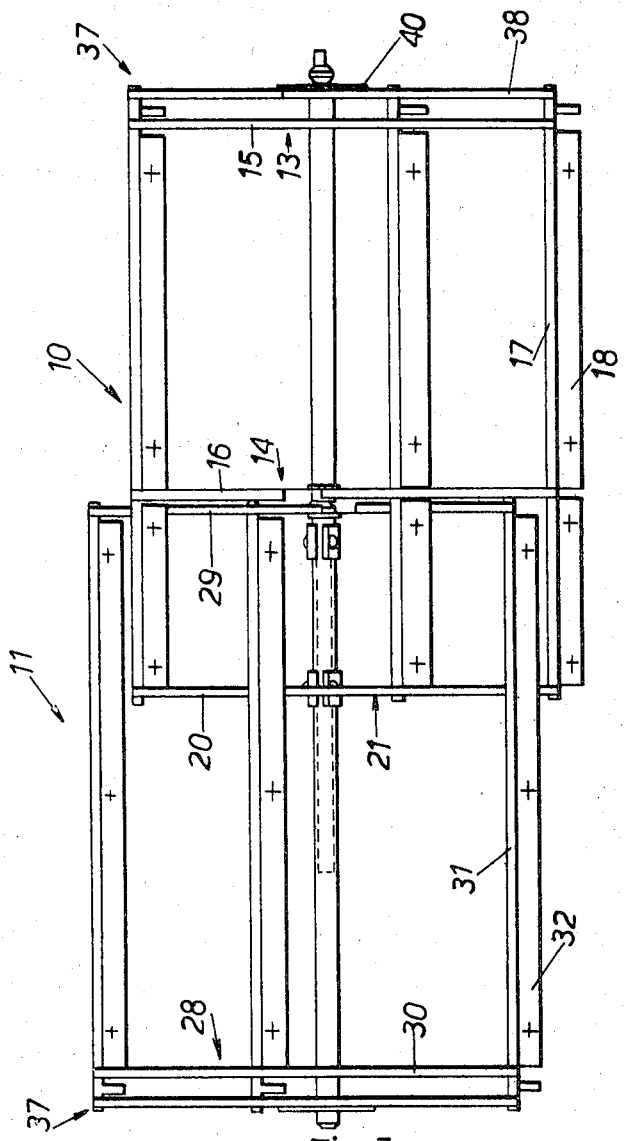
FIG. 3 is a diagrammatic view corresponding to FIG. 1, with the reel in its fully contracted condition, and to a reduced scale.
Figure 4:
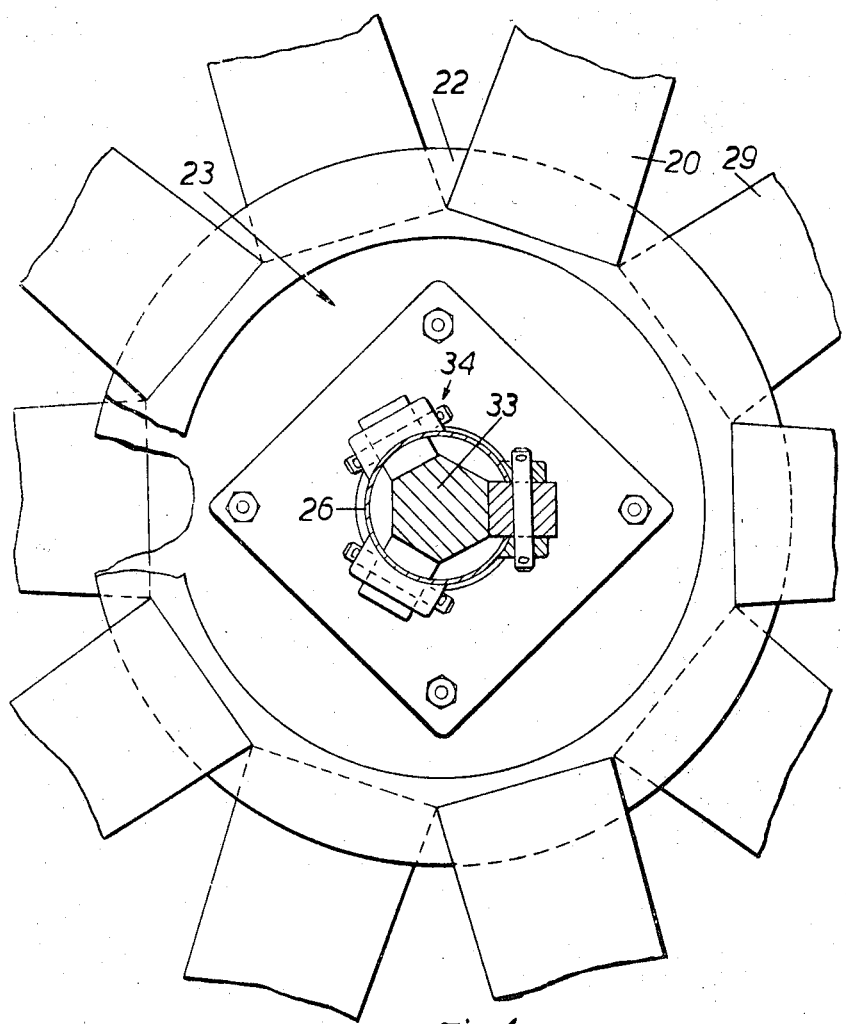
FIG. 4 is a fragmentary part sectional view on the line IV—IV of FIG. 1.

Although only the reel is shown in the drawings, the reel, in use, forms part of a combine header in the normal manner and works over, and generally in front of, the cutter bar so as to present the crop correctly for cutting and subsequent transport by the auger to the elevator and hence into the threshing mechanism.

As in the co-pending patent application aforesaid, the table, the reel, the cutter and the auger are adjustable so that the width of the header may be reduced for road travel.

The reel is of the universal type. That is to say it includes fingers which are under the control of a cam system to maintain them at all times generally vertical. The reel has two portions 10 and 11, each generally similar. The portion 10 operates over the fixed portion of the table, and includes a driven central tubular shaft 12. Spiders 13, 14 having arms 15, 16 respectively are rigidly attached one to each end of the shaft 12 and corresponding arms 15, 16 have rotatably connected to them cross rods 17 from which depend bars or slats 18 carrying fingers or tines 19.

The rods 17 extend inwardly beyond the spider 14 and are attached to arms 20 of an end spider 21. The arms 20 radiate from a hub member 22 having a central hole 23. Slats 24 carrying further fingers 19 are also provided on the extended portions of the rods 17.

The portion 11 is generally similar to the portion 10 and includes a central driving tubular shaft 26 having spiders 27, 28 mounted on its ends.

The spiders 27, 28 have arms 29, 30 respectively carrying rotatable cross rods 31 supporting slats 32 and having further fingers 19. The reel portion 11 is out-of-phase with the reel portion 10. That is to say the arms 29, 30 of the reel portion 11 are angularly spaced relative to the arms 15, 16, 20 of the reel portion 10. The rods 17 pass between the arms 29, and the spider 21 is to the side of the spider 27 remote from the spider 14, intermediate the spiders 27, 28. The reel portions thus cannot separate accidentally or unintentionally.

A driving shaft 33, which is hexagonal in cross section, is rigidly attached to the shaft 12 and extends into the tube 26. The latter carries two sets of three rollers 34 which are circumferentially spaced and bear on alternate faces of the shaft 33, thus providing both a driving and sliding connection.

Each of the reel portions 10, 11 has at one end a control device 37 for controlling the attitude of the tines 19 and, since they are similar, only the spider 37 associated with portion 11 will be described briefly, since this is a common feature of universal reels.

The control device 37 includes a spider with arms 38 mounted on a control ring 39 which can be adjusted to a suitable position eccentric to the spider 28 by a control lever 40, screws holding the latter locked in a bracket 40A on the shaft 26. A connecting lever 41 has one end rigidly attached to each rod 31 and its other end pivoted on the arm 38. In operation, the two control devices are set independently by the operator, so that both have the same effect.

In the above described embodiment, it will be seen that there is only one telescopic component, which is the shaft 12, 33, 26, the reel torque is transmitted only through the latter, and the shaft is easily telescoped due to the rollers which also transmit driving torque.

The reel need not be of the universal type, but may be a bat reel with fixed cross bars without tines.

What is claimed is:

1. A reel for a combine header, the reel comprising two reel portions having cross bars, the bars of one of said reel portions being angularly spaced relative to the bars of the other portion, and being carried respectively by parts of a central telescopic shaft so that one reel portion is adjustable relative to the other portion between an extended condition and a contracted condition, a driving connection between the parts of the telescopic shaft comprising circumferentially spaced rollers on one of said parts bearing on correspondingly spaced runways on the other part of the shaft, and means limiting movement of the reel portions from contracted to extended conditions to prevent separation of the reel portions.

2. A reel as claimed in claim 1, in which one of said shaft parts is hexagonal, and faces of said part form said runways.

3. A reel as claimed in claim 2, in which alternate faces of said shaft part form said runways, and there is a plurality of groups of three rollers bearing on said runways.

4. A reel for a combine header comprising two reel portions having cross bars, the bars of one of said reel portions being angularly spaced relative to the bars of the other portion, spiders at each end of said reel portions and a central telescopic shaft to carry the bars so that one reel portion is adjustable relative to the other portion between an extended condition and a contracted condition and wherein one end spider of one reel portion is located intermediate the end spiders of the other reel portion and has a central hole through which said telescopic parts of the central shaft pass, and limiting means to limit movement of the reel portions from contracted to extended conditions to prevent separation of the reel portions.

5. An adjustable length reel for a combine header comprising two reel portions rotatable about a common axis, at least an inner and an outer spider for each reel portion rotatable about said axis, the inner spider of one reel portion being located between the inner and outer spiders of the other reel portion, a plurality of bars attached to the spiders of each reel portion with the bars of one reel portion being spaced from the bars of the other reel portion to permit limited movement of one reel portion relative to the other reel portion in a direction parallel to said common axis, stop means to limit movement of one reel portion relative to the other in a direction parallel to said common axis, and means to rotatably support the reel portions.

6. The adjustable length reel of claim 5 wherein the means to rotatably support the reel portions includes a telescopic shaft.

7. The adjustable length reel of claim 6 wherein at least one of the inner spiders has a central hole through which a portion of the telescopic shaft passes.

8. The adjustable length reel of claim 6 wherein said telescopic shaft rotates both reel portions about said common axis.

9. The adjustable length reel of claim 5 wherein the spiders are rigid members.

References Cited

UNITED STATES PATENTS

| | | | |
|---|---|---|---|
| 2,431,397 | 11/1947 | Harrison | 56—226 |
| 2,506,980 | 5/1950 | Verger | 56—167 |
| 2,644,289 | 7/1953 | Hume | 56—226 |
| 3,145,520 | 8/1964 | Hume et al. | 56—226X |
| 3,468,109 | 9/1969 | Reimer | 56—220 |

FOREIGN PATENTS

| | | | |
|---|---|---|---|
| 187,332 | 10/1956 | Austria | 56—220 |

F. BARRY SHAY, Primary Examiner

J. N. ESKOVITZ, Assistant Examiner